United States Patent [19]

Marsico et al.

[11] Patent Number: 4,686,325

[45] Date of Patent: Aug. 11, 1987

[54] CATENARY SAG ADJUSTMENT USING ADDED WEIGHTS

[76] Inventors: Ronald Marsico, 935 Loch Ness Ave., Worthington, Ohio 43085; Bruce Freimark, 814 Francis Ave., Bexley, Ohio 43209

[21] Appl. No.: 864,075

[22] Filed: May 16, 1986

[51] Int. Cl.[4] .............................................. H02G 7/00
[52] U.S. Cl. .................................... 174/40 R; 174/43
[58] Field of Search .................. 174/40 R, 40 TD, 42, 174/43, 45 R, 45 TD; 52/40

[56] References Cited

FOREIGN PATENT DOCUMENTS 586887 10/1933 Fed. Rep. of Germany .... 174/40 R
366708 2/1932 United Kingdom ............. 174/40 R
842181 6/1981 U.S.S.R. ................................. 52/40

OTHER PUBLICATIONS

Acton, Win, "Computer Aids Weight-On-Line Solutions," *Transmission and Distribution*, Nov. 1978, pp. 40–42.

*Primary Examiner*—Laramie E. Askin

[57] ABSTRACT

Methods to achieve catenary sag and shape adjustments that can reduce sags and increase clearances at certain locations of overhead flexible conductors, cables, strands, or wires to underlying lands, roads, waters, and other objects by permanently adding and attaching essentially concentrated weights or weight of certain magnitudes and positions on the said conductors, cables, strands, or wires.

6 Claims, 9 Drawing Figures

CATENARY SAG ADJUSTMENT USING ADDED WEIGHTS

FIELD OF THE INVENTION

The invention relates to methods of reducing sags and increasing clearances of flexible overhead conductors, cables, strands, or wires to underlying lands, roads, waters, and other objects at certain locations without raising supporting structures or cutting out a section of the conductors, cables, strands, or wires in order to reduce their sag.

BACKGROUND ART

Occasionally, on existing overhead electrical power lines or other utility lines, it is necessary to obtain additional clearance between energized electrical power lines or other utility lines and underlying lands, roads, waters, and other objects such as farms, pastures, highways, driveways, utility lines, buildings, lakes, and rivers.

While solutions such as raising structures, lowering or rerouting of underlying lines, and installation of additional structures are all accepted practices, it is desirable and useful to have alternate solutions which are less disruptive to existing facilities, quicker to install, reduce outage time, and are more cost effective.

OBJECTS OF THE INVENTION

It is therefore an object of our invention to provide alternate and novel methods of increasing clearances between existing overhead electrical power lines or other utility lines to underlying lands, roads, waters, and other objects by methods which minimize disruption to existing facilities and by utilizing readily available materials.

It is a further object of our invention to provide alternate and novel methods to offset extra conductor, cable, strand, or wire sags on existing overhead electrical power lines that would result when it sometimes is desired to increase the current and power delivery capability of certain lines. As the current in amperes increases on an electrical power line, the temperature of the conductor, cable, strand, or wire also increases with corresponding increases in sags. These increases in sags may be partially or completely offset by the decreases in sag that may be obtained along a few or many miles of electrical power lines by selective and repetitive use of one or more of our catenary sag adjustment methods recited in our claims or as illustrated in FIGS. 1A, 1B, 1C, 2A, 2B, 2C, 3A, 3B, and 3C.

GENERAL DESCRIPTION OF THE INVENTION

Broadly, this invention relates to methods by which a flexible conductor, cable, strand, or wire which normally hangs in the shape of a catenary (which is the mathematical curve that results from the uniform weight per lineal foot of flexible conductor, cable, strand, or wire being supported by adjacent structures) has its sag permanently adjusted such that certain sections of the span between structures are raised while other sections of the span between structures may be lowered.

This catenary sag adjustment is accomplished by the permanent addition and attachment of essentially concentrated weights or weight to the conductors, cables, strands, or wires at various locations in spans adjacent to or in near proximity to the span desired to be adjusted or within the adjusted span itself.

Our invention, therefore, artificially changes the basic catenary shape such that at certain locations within the span or spans the sag of the conductor, cable, strand, or wire can be decreased (with resulting increased clearance to underlying lands, roads, waters, and other objects) and at other locations within the span or spans (where there may be excessive clearance to underlying lands, roads, waters, and other objects) the sag may be increased.

As used herein, flexible means that the ratio of the diameter of the conductors, cables, strands, or wires divided by their respective lengths is negligibly small.

As used herein, span is the horizontal distance between any two adjacent supporting structures to which are attached overhead electrical power lines or other utility lines.

As used herein, sag is the vertical distance between a straight line drawn between the adjacent conductor, cable, strand, or wire connection points at the insulators and hardware on the adjacent supporting structures and the normal or adjusted catenary curve formed by the said conductor, cable, strand, or wire at a particular location within the span.

In a practical test on an existing electrical power line, we have found that by utilizing the method illustrated in FIGS. 1A, 1B, and 1C where the average span between supporting structures was approximately 1,265 feet and the bare weight per foot of the conductor was 1.434 pounds per lineal foot with a diameter of 1.345 inches, the addition of approximately 525 pounds of essentially concentrated weights at each of the two locations shown resulted in a calculated approximate 2.5 feet less sag at a location at the middle of the middle span 5–6 at a conductor temperature of 171° F. as compared to the normal bare conductor catenary sag without added weights. The weights were located approximately 128 feet from structures 5 and 6 in FIG. 1C in the spans adjacent to the middle span 5–6 and it was in the middle span between structures 5 and 6 in FIG. 1C where a decrease in sag and a corresponding increase in clearance to underlying land was desired. In the spans 4–5 and 6–7 which contain the approximately 525 pounds each of essentially concentrated weights, there was a calculated increase in conductor sag of approximately 2.0 to 2.5 feet at the middle of the spans, with a corresponding calculated decrease in clearance to underlying ground at 171° F. conductor temperature; however, ground clearance in these spans was sufficient to absorb the calculated increases in conductor sag.

In practice it is expected that the addition of essentially concentrated weights or weight at various locations (which weights or weight are permanently attached on the conductor, cable, strand, or wire at appropriate distances away from the connection points or point of the insulators to the conductor, cable, strand, or wire) can cause catenary sags to change by approximately one to five feet. However, the actual magnitude and direction of sag changes that occur at specific installation locations and in the vicinity of these locations are affected by such things as: amount of added weights or weight and their location in various spans; type of conductor, cable, strand, or wire and its weight per lineal foot, its diameter and installed tension; length of spans; insulator and hardware configuration (suspension or dead-end); temperature; wind; and ice conditions. Since the addition of concentrated weights or weight increases conductor tensions and increases vertical loads, the effect on the conductor, structures, hardware, and insulator loadings within the installation locations and in the vicinity of the installation locations needs to be considered, as well as possible effects of the added concentrated weights or weight on aeolian vibration and the placement of aeolian vibration dampers. Other factors affecting the magnitude and direction of sag changes caused by the addition of added concentrated weights or weight in the span or spans with added weights or weight and also in the vicinity of these spans are: the magnitude of normal catenary sags, span lengths, vertical span lengths, types of structures, insulator and hardware assembly lengths and their respective weights, 60° F. conductor creep, and high-temperature conductor creep. Furthermore, adding concentrated weights or weight, while raising some sections of the catenary sag, will lower other sections of the catenary sag and these effects need to be taken into account in the various affected spans. Also, the influence of the added concentrated weights or weight on the magnitude and direction of sag changes in other spans in the vicinity of the installation needs to be considered. Sags and clearances and other appropriate calculations and field measurements should be made at various locations in all spans in the vicinity of and including spans to which concentrated weights or weight are added to verify changes (increases and decreases) in sags and clearances that occur under various conductor temperature and weather loading conditions. The effects of added concentrated weights or weight, with respect to increased vertical loads, differential longitudinal loads and increased tensions on the conductors, cables, strands, wires, insulators, hardware, dampers, structures, and foundations, must also be considered, as well as the effects of added concentrated weights or weight on clearances between conductors and groundwires on the same structure.

DETAILED DESCRIPTION (The Figures Are Not Drawn To Scale)

Figure 1A:
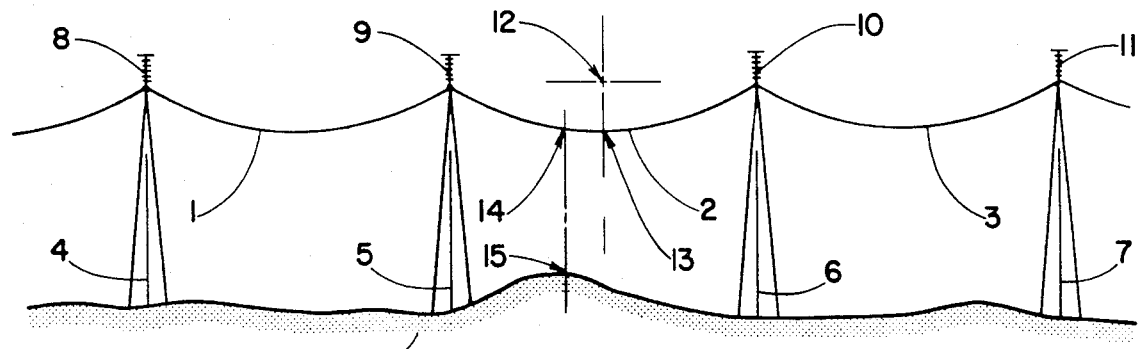
FIG. 1A is a schematic elevational view of a portion of an overhead electrical power line having points indicated thereon used for explaining principles of the invention according to a first embodiment thereof.

FIG. 1A shows the normal flexible conductor, cable, strand, or wire 1, 2, and 3 catenary sags of a series of three spans attached to insulators and hardware 8, 9, 10, and 11 and supported by structures 4, 5, 6 and 7 known as suspension structures in the electric power industry. A catenary is a mathematical curve which describes the shape of a uniformly loaded (along its true length) flexible conductor, cable, strand, or wire supported between two points. Insulators and hardware are indicated at 8, 9, 10, and 11 and are attached to structures 4, 5, 6, and 7 respectively. Note for span 5-6 the sag between point 13 on the catenary and point 12 vertically above and on a straight line between insulator and hardware attachments 9 and 10 and also the minimum clearance between point 14 on the catenary and point 15 vertically below on the underlying land 28. Underlying land 28 is shown shaded.

Figure 1B:
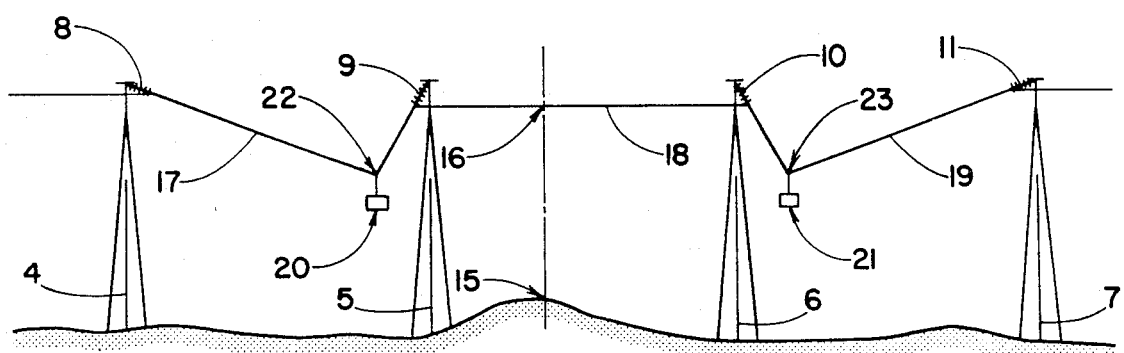
FIG. 1B is a view similar to that of FIG. 1A and showing an effect of permanently adding and attaching weights to the power line to adjust sag in accordance with a first embodiment of the invention on an assumed weightless and flexible conductor, cable, strand, or wire.

FIG. 1B shows the effect of permanently adding and attaching essentially concentrated weights 20 and 21 at locations 22 and 23, respectively, in spans 4-5 and 6-7 immediately adjacent to the middle span 5-6, to an assumed weightless and flexible conductor, cable, strand, or wire 17, 18, and 19 which is attached through insulators and hardware 8, 9, 10, and 11 to supporting structures 4, 5, 6, and 7 respectively. The shape of this conductor, cable, strand, or wire is seen to consist of a series of straight lines. Note for span 5-6 the smaller sag in the conductor, cable, strand, or wire 18 and the greater vertical clearance between points 16 and 15 near the mid-portion of the middle span 5-6 and how the suspension insulators and hardware 8, 9, 10, and 11 on adjacent structures move longitudinally along the line towards the spans with the added weights 20 and 21. Underlying land 28 is shown shaded.

Figure 1C:
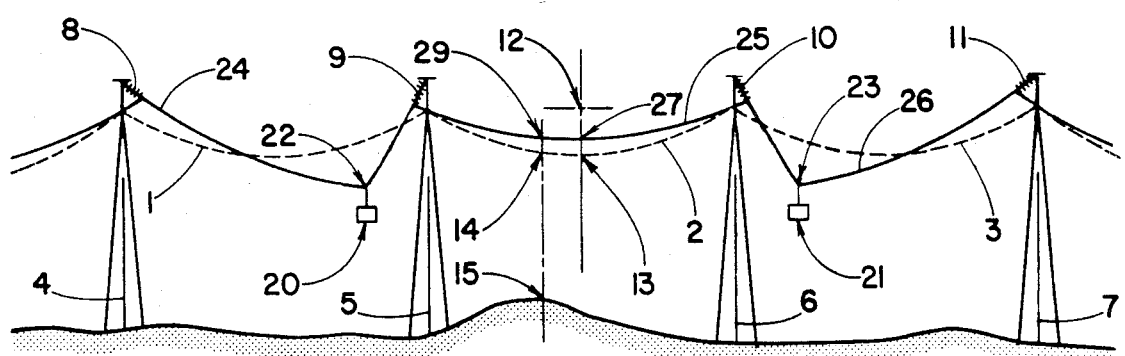
FIG. 1C is a view similar to FIG. 1B but showing the superimposed effects of the descriptions in FIGS. 1A and 1B and obtained by adding and attaching weights in accordance with the first embodiment of the invention.

In FIG. 1C, the conductor, cable, strand or wire shapes shown in FIGS. 1A and 1B are combined and superimposed resulting in adjusted catenary sags and shapes shown by the solid curved lines 24, 25, and 26 such that certain sections of the various spans move upwards while other sections move downward when compared to the dashed curved lines 1, 2, and 3 representing the normal catenary sags from FIG. 1A. Note for span 5-6 that points 27 and 29 move upward relative to points 13 and 14, respectively, and the vertical clearance between point 29 and point 15 is greater in FIG. 1C than the vertical clearance between point 14 and point 15 in FIG 1A. Also note that the sag between points 27 and 12 in FIG. 1C is less than the sag between points 13 and 12 in FIG. 1A. It should also be noted that, depending on many factors, it is likely that in FIG. 1C the conductor, cable, strand or wire positions depicted by the solid curved line 24 in span 4–5 and the solid curved line 26 in span 6–7 can sag below the curved dashed lines 1 and 3 respectively; if this occurs there needs to be adequate clearance between lines 24 and 26 and the respective underlying lands, roads, waters, and other objects in respective spans 4–5 and 6–7. Underlying land 28 is shown shaded.

Figure 2A:
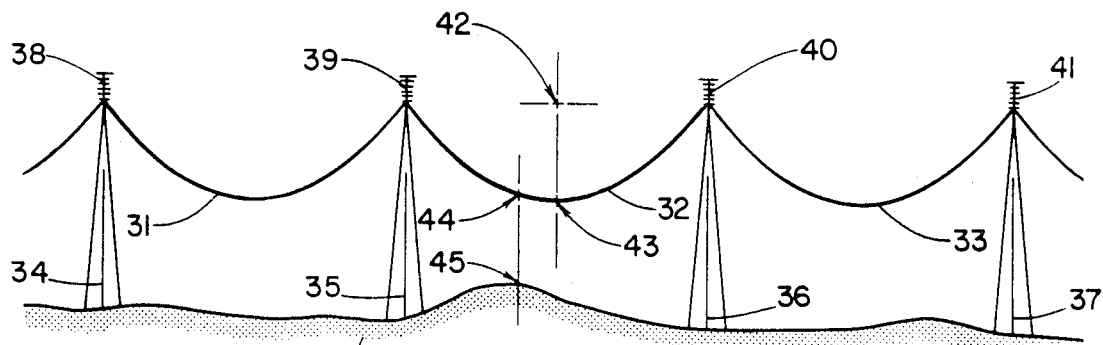
FIG. 2A is a schematic elevational view of a portion of an overhead electrical power line having points indicated thereon used for explaining principles of the invention according to a second embodiment thereof.

FIG. 2A shows the normal flexible conductor, cable, strand, or wire 31, 32, and 33 catenary sags of a series of three spans attached to insulators and hardware 38, 39, 40, and 41 and supported by structures 34, 35, 36 and 37 known as suspension structures in the electric power industry. A catenary is a mathematical curve which describes the shape of a uniformly loaded (along its true length) flexible conductor, cable, strand, or wire supported between two points. Insulators and hardware are indicated at 38, 39, 40, and 41 and are attached to structures 34, 35, 36, and 37 respectively. Note for span 35–36 the sag between point 43 on the catenary and point 42 vertically above and on a straight line between insulator and hardware attachments 39 and 40 and also the minimum clearance between point 44 on the catenary and point 45 vertically below on the underlying land 58. Underlying land 58 is shown shaded.

Figure 2B:
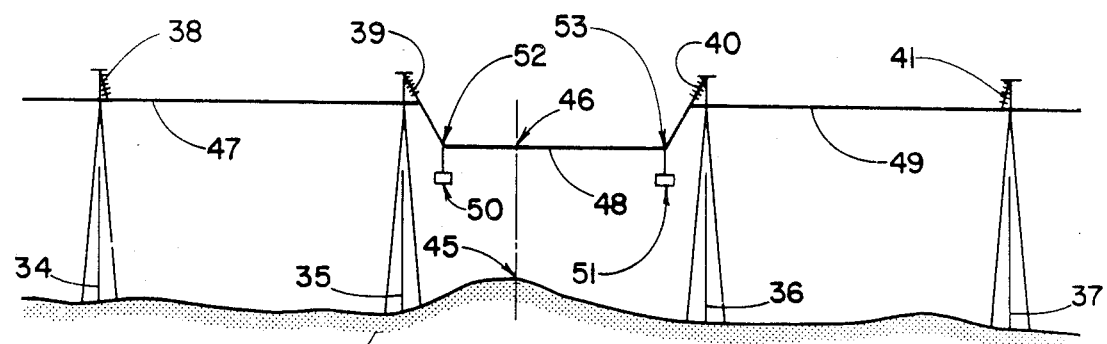
FIG. 2B is a view similar to that of FIG. 2A and showing an effect of permanently adding and attaching weights to the power line to adjust sag in accordance with a second embodiment of the invention on an assumed weightless and flexible conductor, cable, strand, or wire.

FIG. 2B shows the effect of permanently adding and attaching essentially concentrated weights 50 and 51 at locations 52 and 53, respectively, in the middle span 35–36, to an assumed weightless and flexible conductor, cable, strand, or wire 47, 48, and 49 which is attached through insulators and hardware 38, 39, 40, and 41 to supporting structures 34, 35, 36, and 37 respectively. The shape of this conductor, cable, strand, or wire is seen to consist of a series of straight lines. Note how the suspension insulators and hardware 39 and 40 attached to adjacent structures 35 and 36, respectively, move longitudinally along the line and towards the weights 50 and 51 within the middle span 35–36. In this configuration, the longitudinal movement of the suspension insulators and hardware 39 and 40 towards the added weights 50 and 51 tends to partially offset the tendency of the center portion 46 of the span 35–36 to rise. The added weights 50 and 51 need to be of such magnitude and at such positions 52 and 53, respectively, that the net effect on the middle span 35–36 is such that the center portion 46 of the span 35–36 rises above the normal catenary position. Underlying land 58 is shown shaded.

Figure 2C:
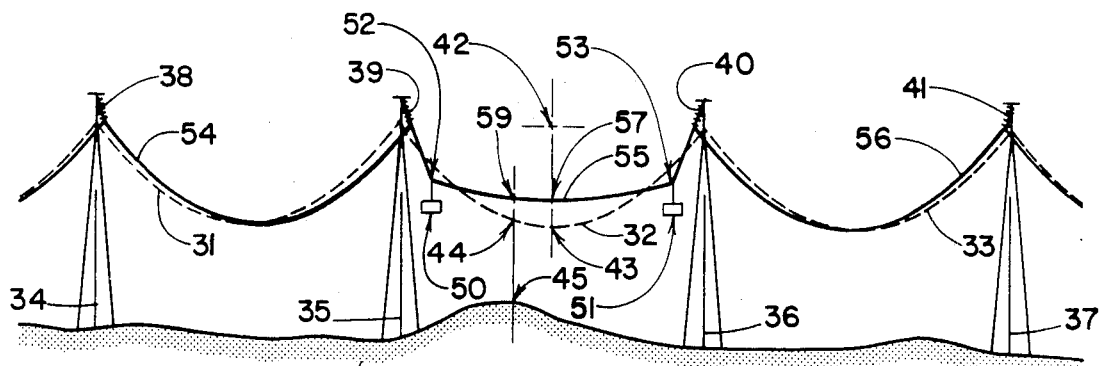
FIG. 2C is a view similar to FIG. 2B but showing the superimposed effects of the descriptions in FIGS. 2A and 2B and obtained by adding and attaching weights in accordance with the second embodiment of the invention.

In FIG. 2C, the conductor, cable, strand or wire shapes shown in FIGS. 2A and 2B are combined and superimposed resulting in adjusted catenary sags and shapes shown by the solid curved lines 54, 55, and 56 such that certain sections of the various spans move upwards while other sections move downwards when compared to the dashed curved lines 31, 32, and 33 representing the normal catenary sags from FIG. 2A. Note in span 35–36 that points 57 and 59 move upward relative to points 43 and 44, respectively, and the vertical clearance between point 59 and point 45 is greater in FIG. 2C than the vertical clearance between point 44 and point 45 in FIG. 2A. Also note that the sag between points 57 and 42 in FIG. 2C is less than the sag between points 43 and 42 in FIG. 2A. Underlying land 58 is shown shaded.

Figure 3A:
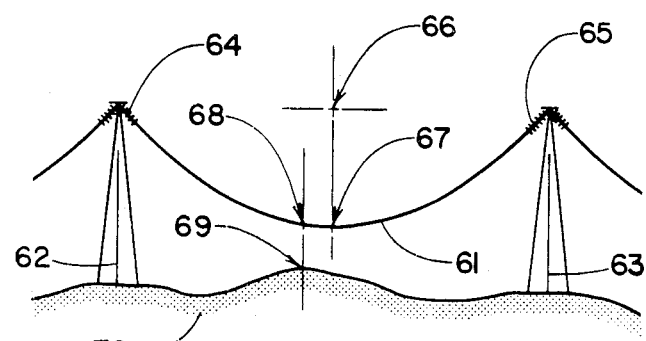
FIG. 3A is a schematic elevational view of a dead-ended span of an overhead electrical power line having points indicated thereon used for explaining principles of the invention according to a third embodiment thereof.

FIG. 3A shows the normal flexible conductor, cable, strand, or wire 61 catenary sag attached through insulators and hardware 64 and 65 of a dead-ended span between structures 62 and 63. A catenary is a mathematical curve which describes the shape of a uniformly loaded (along its true length) flexible conductor, cable, strand or wire supported between two points. The weight of the dead-ended insulators and hardware 64 and 65 at structures 62 and 63, respectively, attachment points is usually small in comparison to the weight of the overall length of conductor, cable, strand, or wire 61; and the insulators and hardware 64 and 65 weight per lineal foot is assumed to be equal to the weight per lineal foot of the conductor, cable, strand, or wire 61 in the remainder of the span 62–63. Note the sag between point 67 on the catenary and point 66 vertically above on a straight line between insulator and hardware attachment points 64 and 65 at structures 62 and 63, respectively, and also the minimum clearance between point 68 on the catenary and point 69 vertically below on the underlying land 79. Underlying land 79 is shown shaded.

Figure 3B:
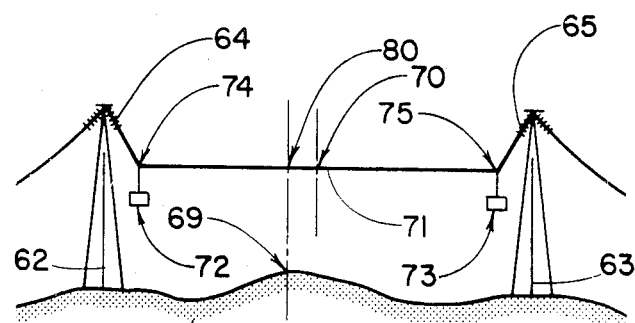
FIG. 3B is a view similar to that of FIG. 3A and showing an effect of permanently adding and attaching weights to the power line to adjust sag in accordance with the third embodiment of the invention on an assumed weightless and flexible conductor, cable, strand, or wire.

FIG. 3B shows the effect of permanently adding and attaching essentially concentrated weights 72 and 73 at locations 74 and 75, respectively, to an assumed weightless and flexible span of conductor, cable, strand, or wire 71 which is dead-ended through assumed weightless insulators and hardware 64 and 65 to the supporting structures 62 and 63 respectively. Note the smaller sag in the conductor, cable, strand, or wire 71 at point 70 and other locations and the greater vertical clearance between points 69 and 80 near the mid-portion of the span 62–63. The shape of this conductor, cable, strand, or wire is seen to consist of a series of straight lines. Underlying land 79 is shown shaded.

Figure 3C:
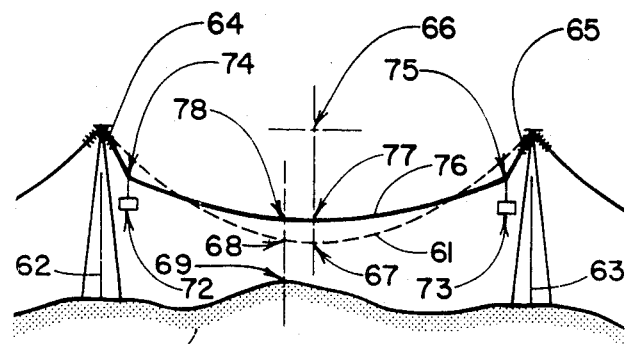
FIG. 3C is a view similar to FIG. 3B but showing the superimposed effects of the descriptions in FIGS. 3A and 3B and obtained by adding and attaching weights in accordance with the third embodiment of the invention.

In FIG. 3C, the cable shapes shown in FIGS. 3A and 3B are combined and superimposed resulting in an adjusted catenary sag and shape shown by the solid curved line 76 such that certain sections of the span move upwards while other sections move downwards when compared to the dashed curved line 61 representing the normal catenary sag from FIG. 3A. The weight of the dead-ended insulators and hardware 64 and 65 at structures 62 and 63, respectively, attachment points is usually small in comparison to the weight of the overall length of conductor, cable, strand, or wire 61 or 76; and the insulators and hardware 64 and 65 weight per lineal foot is assumed to be equal to the weight per lineal foot of the remainder of conductor, cable, strand, or wire 61 or 76 in the remainder of the span 62–63. Note that points 77 and 78 move upward relative to points 67 and 68, respectively, and the vertical clearance between points 78 and 69 in FIG. 3C is greater than the vertical clearance between points 68 and 69 in FIG. 3A. Also note that the sag between points 77 and 66 in FIG. 3C is less than the sag between points 67 and 66 in FIG. 3A. Underlying land 79 is shown shaded.

DESCRIPTION OF THE PREFERRED EMBODIMENT

Referring to FIG. 1A, there is illustrated a series of spans of a portion of a typical electrical power line in which conductors, cables, strand, or wires 1, 2, and 3 with normal catenary sags are attached by insulators and hardware 8, 9, 10, and 11 to supporting structures 4, 5, 6, and 7 respectively. Note for span 5–6 the sag between point 13 on the catenary and point 12 vertically above and on a straight line between insulator and hardware attachments 9 and 10 and also the minimum clearance between point 14 on the catenary and point 15 vertically below on the underlying land 28. Underlying land 28 is shown shaded.

As shown in FIG. 1B, there is illustrated a series of spans in which the conductor, cable, strand, or wire 17, 18, and 19 is assumed to be weightless and in spans containing conductor, cable, strand, or wire 17 and 19 are added essentially concentrated weights 20 and 21 at locations 22 and 23 respectively. Added weight 20 causes insulator and hardware strings 8 and 9 to move towards weight 20. Added weight 21 causes insulator and hardware strings 10 and 11 to move towards weight 21. Added weights 20 and 21 also tighten the conductor, cable, strand, or wire 18 thereby decreasing the sag in the middle span defined between structures 5 and 6 thus increasing the clearance between points 16 and 15. Underlying land 28 is shown shaded.

Referring to FIG. 1C, there is illustrated by the solid curved lines 24, 25, and 26 the combined and superimposed effects of conductor, cable, strand, or wire positions shown in FIGS. 1A and 1B resulting in adjusted catenary sags and shapes. In particular, it should be noted that the sag of the conductor, cable, strand, or wire between points 27 and 12 in the center portion of the span defined between structures 5 and 6 in FIG. 1C decreases as compared to the sag between points 13 and 12 in FIG. 1A. As shown in FIG. 1C also resulting is a corresponding increase in clearance between point 29 and point 15 on underlying lands, roads, waters, and other objects as compared to the clearance between point 14 and point 15 in FIG. 1A. The reduction in sag, shown as the vertical distance between points 13 and 27 in FIG. 1C, is the desired result of adding weights 20 and 21 at locations 22 and 23 respectively. In FIG. 1C, as illustrated by the solid curved lines 24, 25, and 26 representing the adjusted catenary shapes and the dashed curved lines 1, 2, and 3 representing the normal catenary shapes from FIG. 1A in spans defined between structures 4–5, 5–6, and 6–7, is the change in shape and location of conductor, cable, strand, or wire caused by the addition of weights 20 and 21 at locations 22 and 23 respectively. It should also be noted that, depending on many factors, it is likely that in FIG. 1C the conductor, cable, strand or wire positions depicted by the solid curved line 24 in span 4–5 and the solid curved line 26 in span 6–7 can sag below the curved dashed lines 1 and 3 respectively; if this occurs there needs to be adequate clearance between lines 24 and 26 and the respective underlying lands, roads, waters, and other objects in respective spans 4–5 and 6–7. Underlying land 28 is shown shaded.

We claim:

1. A method of adjusting normal flexible conductor, cable, strand, or wire catenary sags and shapes comprising the step of permanently adding and attaching essentially concentrated weights or weight of appropriate magnitude and position on conductors, cables, strands, or wires in spans immediately adjacent to a span in which it is desired to reduce sag and thereby increase clearances at certain locations to underlying lands, roads, waters, and other objects.

2. A method of adjusting normal flexible conductor, cable, strand, or wire catenary sags and shapes according to claim 1 wherein said step is selectively and repetitively carried out along a few or many miles of an electrical power line in order to increase the electrical current and power carrying capability of the line while still maintaining satisfactory clearances to underlying lands, roads, waters, and other objects.

3. A method of adjusting normal flexible conductor, cable, strand, or wire catenary sags and shapes comprising the step of permanently adding and attaching essentially concentrated weights or weight of appropriate magnitude and position on conductors, cables, strands, or wires in spans in the near proximity of, but not necessarily adjacent to, a span in which it is desired to reduce sag and thereby increase clearances at certain locations to underlying lands, roads, waters, and other objects.

4. A method of adjusting normal flexible conductor, cable, strand, or wire catenary sags and shapes according to claim 3 wherein said step is selectively and repetitively carried out along a few or many miles of an electrical power line in order to increase the electrical current and power carrying capability of the line while still maintaining satisfactory clearances to underlying lands, roads, waters, and other objects.

5. A method of adjusting normal flexible conductor, cable, strand, or wire catenary sags and shapes comprising the step of permanently adding and attaching essentially concentrated weights or weight of appropriate magnitude and position on conductors, cables, strands, or wires within a span in which it is desired to reduce sag and thereby increase clearances at certain locations to underlying lands, roads, waters, and other objects.

6. A method of adjusting normal flexible conductor, cable, strand, or wire catenary sags and shapes according to claim 5 wherein said step is selectively and repetitively carried out along a few or many miles of an electrical power line in order to increase the electrical current and power carrying capability of the line while still maintaining satisfactory clearances to underlying lands, roads, waters, and other objects.

* * * * *